E. F. HATHAWAY & C. LEA.
HARNESS SUPPORT FOR DRAWING-IN MACHINES.
APPLICATION FILED APR. 8, 1910.
1,150,595.
Patented Aug. 17, 1915.
2 SHEETS—SHEET 1.
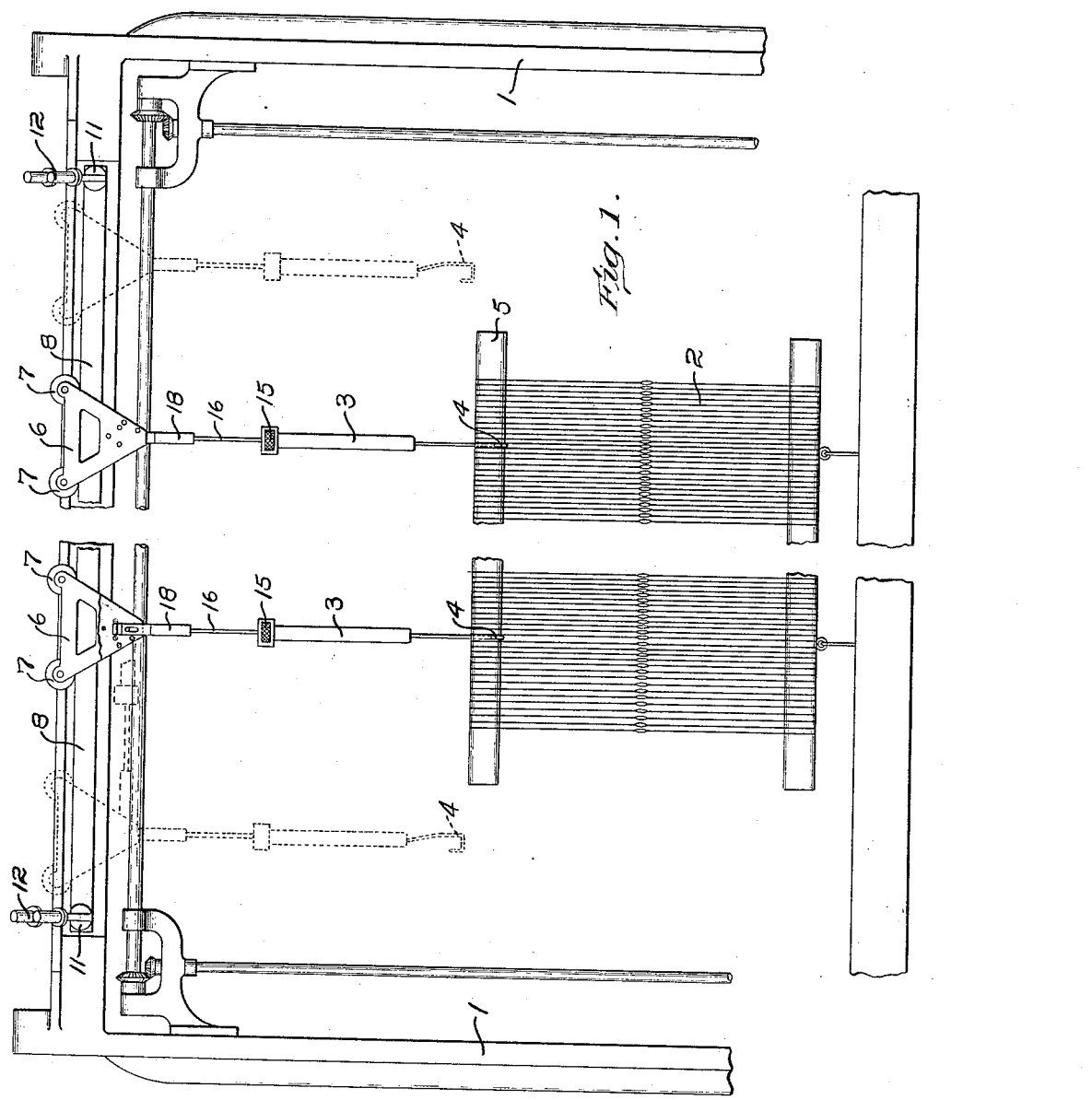

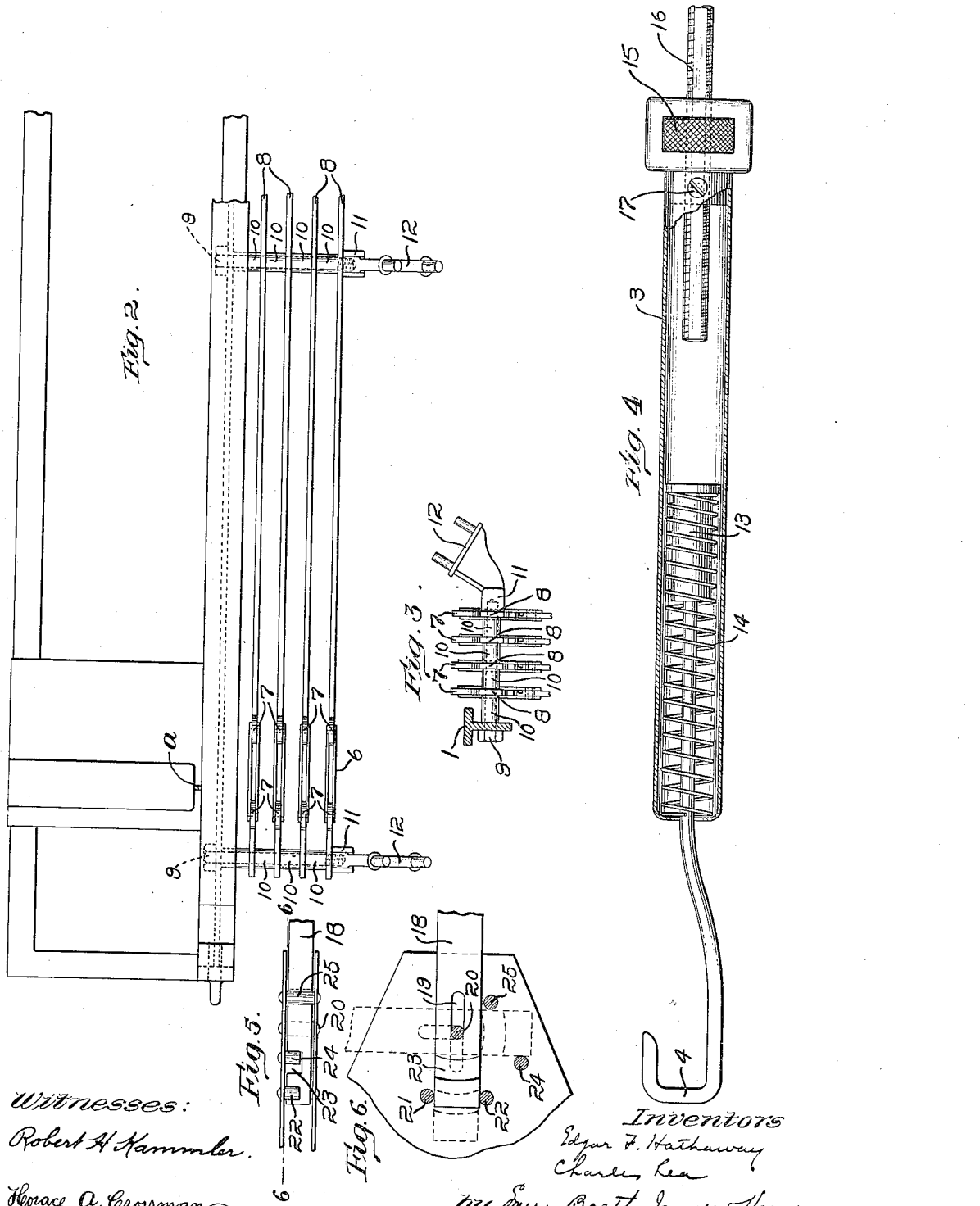

UNITED STATES PATENT OFFICE.

EDGAR F. HATHAWAY AND CHARLES LEA, OF BOSTON, MASSACHUSETTS, ASSIGNORS TO AMERICAN WARP DRAWING MACHINE COMPANY, A CORPORATION OF MAINE.

HARNESS-SUPPORT FOR DRAWING-IN MACHINES.

1,150,595.

Specification of Letters Patent.

Patented Aug. 17, 1915.

Application filed April 8, 1910. Serial No. 554,175.

*To all whom it may concern:*

Be it known that we, EDGAR F. HATHAWAY and CHARLES LEA, both citizens of the United States, and residents of Boston, county of Suffolk, and Commonwealth of Massachusetts, have invented an Improvement in Harness-Supports for Drawing-In Machines, of which the following description, in connection with the accompanying drawings, is a specification, like letters on the drawings representing like parts.

This invention relates to devices for supporting a harness or harnesses in a drawing-in machine, being more particularly intended to provide a harness support which will permit the ready installation of the harness in the machine or its detachment therefrom, and which will offer the least interference with other work required to be done in connection with the machine.

The invention will be best understood by reference to the following description when taken in connection with the accompanying illustration showing one specific embodiment thereof while its scope will be more particularly pointed out in the appended claims.

Referring to the drawings: Figure 1 shows a portion of the structure of a drawing-in machine with one form of our invention applied thereto; Fig. 2 is a plan view partly broken away of the drawing-in machine shown in Fig. 1; Fig. 3 is a side elevation partly in section showing a detail of the harness supporting portion of the machine; Fig. 4 is a longitudinal sectional plan on an enlarged scale showing one of the harness hangers. Fig. 5 is a side elevation showing the connection of the wheeled carrier to the harness hanger, and Fig. 6 is a section in plan on the line 6—6 in Fig. 5.

Referring to the drawings and to the embodiment of our invention therein shown, we have there disclosed for illustrative purposes, a portion of the framework 1 of a drawing-in machine of the general type disclosed in the prior U. S. Patents 861,474, 871,680 and 871,681. In this machine the harnesses, reed and warp are supported in a generally parallel arrangement by the arched structure 1 while drawing-in mechanism including the needle supported by a traveling carriage is caused to traverse the extent of the reed, harness and warps.

The specific construction of the drawing-in mechanism, separating and positioning devices for the reed harness and warp, and the supports for the reed and warp being immaterial for the purposes of the present invention the same are not herein shown, but may be of any suitable or usual form and construction.

In machines of this class heretofore it has been customary to support each harness by immovably suspended hangers, or by hangers having such a limited range of movement, that to whatever extent they might be moved lengthwise the machine, they would remain within the vertical limits of the harness and thereby interfere more or less with the application of the other harnesses to the machine or their withdrawal therefrom and generally with the operator's work in installing, removing or adjusting the various parts in the machine.

The harness 2, which is here shown as a knit or cotton harness, but which may be a metallic or a wire harness if desired, is shown supported by a plurality (herein two) of hangers 3, provided each with a depending hook 4 adapted to hook under and sustain the upper harness bar 5 of the harness. Each hanger, instead of being fixedly secured to an overhead support without movement lengthwise the machine, is fastened to a separate carrier 6 so sustained that its position can readily be shifted, as, for example, from the full line position shown in Fig. 1 to the dotted line position. Such a carrier may be constructed in any desired shape and in any desired form, but herein it is composed of a pair of triangular sheet metal plates riveted or otherwise secured together and carrying between them the rollers 7. To the downturned apex of the carrier is secured the depending hanger 3, while the rollers are arranged to travel along a suitable tack bar 8, the latter supported by the framework 1 and the two plates having the track bar between them.

As many track bars and sets of carriers are provided as are required for the number of harnesses which the machine is designed to carry, there being provided, in the illustrated form of machine, four track bars and four sets of carriers. The track bars may be secured to the frame in any desired manner, but herein (see Figs. 2 and 4) they are secured at each end to a bolt 9 which projects rearwardly from the frame, sleeved spacers 10 being slipped over the bolt between the track bars to keep them the requisite distance apart. A nut or other suitable means is applied to the end of each bolt to hold the bars in place, this office being herein performed by the threaded bracket 11 which provides the pocket 12 for the warp clamp when the warp is being installed in the machine. This construction not only provides a firm and rigid trackway for the harness carriers, but also strengthens and braces the frame of the drawing-in machine itself.

Preferably the hanger is so constructed that, while it will readily distend or lengthen to be a predetermined length when subjected to the weight of the harness, when it is detached therefrom and relieved of such weight, it will contract or telescope and thereby draw the hook 4 up out of the way above the level of the harness bar 5 as represented in dotted lines in Fig. 1. This may be accomplished by various constructions, but in the form herein shown, the hanger 3 is a sleeve in which is slidably mounted a piston shaped plunger 13 secured to the upper end of the stem of the hook 4. When the hook is freed, the plunger is raised or drawn up into the sleeve by means of the coiled spring 14 encircling the reduced body portion of the plunger 13 and interposed between the latter and the closed lower end of the sleeve. The spring, while strong enough to lift the hook alone and maintain it lifted, will readily yield under the weight of the harness and draw the plunger down until its lower ends rests upon the closed lower end of the sleeve 3, thus always bringing the hook to rest in the same predetermined position with relation to the sleeve.

The sleeve 3 is held adjustably fixed at any desired height by means of the thumb nut 15 which has threaded engagement with the depending screw rod 16. The rod 16 has a flattened face engaged by a screw 17 carried by the sleeve so that the rod, while freely slidable in and out of the sleeve, cannot turn therein. The turning of the nut 15, therefore, will raise or lower the sleeve to any desired height of adjustment. The threaded rod 16 is secured to the lower end of the depending connecting piece 18, the latter having such a connection to the wheeled carrier 6 that, while normally depending therefrom, it can be swung around at right angles to its normal position, as represented by dotted lines in Fig. 1, and caused to maintain the entire hanger in a horizontal position up out of the way when it is not required for supporting a harness. Such connection may be had in various ways, but herein (see Figs. 5 and 6) the connecting piece 18 is slotted at 19, a pin 20 being provided in the carrier and passing through the slot so that normally the connecting piece hangs down upon the pin which contacts with the upper wall of the slot. In this position it is held rigidly and prevented from swinging sidewise by the pin 21, which passes entirely through the carrier and the pin 22 on the opposite side of the piece 18, the latter pin, however, being, as shown in Fig. 5, of a short length only.

When it is desired to swing the connection and hanger into the rightangled position shown in dotted lines in Fig. 1, the connection can be raised to the dotted line position shown in Fig. 6, which brings a transverse groove or notch 23, formed in the face of the connection 18, opposite the short pin 22 and the connecting piece can thereupon be swung lefthandedly as viewed in Fig. 6 from the full line position there shown to the dotted line position, the notch 23 causing the connecting piece to clear both the pin 22 and a second pin 24 located a little at one side thereof.

The swinging movement as described is limited to 90° by the stop pin 25 which contacts with the connecting piece. When swung to a horizontal position, the piece may be again moved to bring the pin 20 against the upper end of the slot and withdraw the notch 23 from registration with the pin 24 whereupon the connecting piece becomes locked horizontally in the dotted line position shown.

The wheeled carriers being separable, they may be moved quickly to any desired position and the harness attached. On the other hand, in installing the harnesses in the machine, either by hand or through the aid of a loading device, the hangers can be moved to one side as shown in dotted lines beyond the spread or extent of the harnesses and entirely out of the way. This is especially desirable in employing a loading or unloading device, for the harness supporting parts of the latter can be caused to occupy the space above the harnesses in the drawing-in machine without interfering with the parts of the machine. The automatic retraction of the hanger hook as soon as the harness is detached therefrom removes it from interference with the operator's manipulation of the remaining harnesses and, where the machine is used with less than the designed number of harnesses, the idle hangers can be swung up into a horizontal position as described, thereby entirely removing them from interference with the operator or the remaining harnesses.

While we have herein shown and described for the purposes of illustration one specific form of the invention, it is to be understood that extensive changes may be made in the constructional details thereof and the mode of its application without departing from the spirit thereof.

Claims:

1. In a drawing-in machine the combination with a machine frame of thread-placing mechanism, a fixed trackway, a plurality of independently movable and separable wheeled carrier on said trackway and a depending harness support for each carrier, said carriers with said depending supports being movable lengthwise the trackway to separate and leave unobstructed the space between the same normally occupied by the harness.

2. In a drawing-in machine adapted to support a reed, harness and warp, the combination with thread-placing mechanism and a plurality of independently movable and separable wheeled carriers for supporting the harness.

3. In a drawing-in machine adapted to support a reed, harness and warp, the combination with thread-placing mechanism of a harness, a plurality of independently movable and separable wheeled carriers for supporting the same and a fixed trackway on which said carriers are adapted to move.

4. In a drawing-in machine the combination with thread-placing mechanism of a harness and a plurality of independently movable wheeled carriers each provided with a hanger support and a fixed trackway on which said carriers are movable lengthwise the machine.

5. In a drawing-in machine a harness support comprising a hanger, a harness engaging member carried thereby, and means for elevating the engaging member when detached from the harness.

6. In a drawing-in machine the combination with thread-placing mechanism of a harness support comprising a hanger, a harness engaging member, and means for automatically retracting said harness engaging member when relieved of the weight of the harness.

7. In a drawing-in machine a harness support comprising a hanger, a harness engaging hook carried thereby and a retractile spring for lifting said hook when detached from the harness.

8. In a drawing-in machine a harness support comprising a hanger, a harness engaging member adapted to be drawn down, means defining its lowermost position, and means for automatically lifting it when detached from the harness.

9. In a drawing-in machine a harness support comprising a depending hanger sleeve, a harness engaging hook, a plunger slidable within said sleeve and secured to said hook, and a lifting spring interposed between the head of the plunger and the bottom of the sleeve.

10. In a drawing-in machine a harness support comprising a wheeled carrier and a vertically adjustable harness hanger carried thereby.

11. In a drawing-in machine the combination with a harness of a plurality of carriers therefor, said carriers being relatively movable lengthwise the machine and a hanger for each carrier, said hangers being connected each to its carrier to permit of its movement to and retention in a substantially horizontal position.

12. In a drawing-in machine the combination with a frame, a plurality of horizontal track bars rigidly secured to said frame and a harness carrier movably mounted on each of said track bars.

13. In a drawing-in machine the combination with a harness carrier, a hanger depended therefrom, said hanger having connection to said carrier to permit its being normally maintained in substantially a vertical position but to be moved to and maintain a position inclined thereto.

In testimony whereof, we have signed our names to this specification in the presence of two subscribing witnesses.

EDGAR F. HATHAWAY.
CHARLES LEA.

Witnesses:
THOMAS B. BOOTH,
ROBERT H. KAMMLER.